United States Patent
Fan et al.

(10) Patent No.: US 8,705,713 B2
(45) Date of Patent: Apr. 22, 2014

(54) SYSTEM AND METHOD FOR PROCESSING MESSAGES

(75) Inventors: James Fan, San Ramon, CA (US);
Jennifer K. Lam, Fremont, CA (US);
Thomas Barrett, San Ramon, CA (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 1239 days.

(21) Appl. No.: 12/125,803

(22) Filed: May 22, 2008

(65) Prior Publication Data
US 2009/0290690 A1    Nov. 26, 2009

(51) Int. Cl.
*H04M 1/64*    (2006.01)

(52) U.S. Cl.
USPC ............. 379/88.23; 379/88.13; 379/88.14

(58) Field of Classification Search
USPC .......... 379/88.13, 88.14, 93.24, 67.1–71, 379/88.18, 88.22, 88.23, 88.25, 88.26; 455/414.1; 340/540; 380/283; 709/206; 704/246
See application file for complete search history.

(56) References Cited

U.S. PATENT DOCUMENTS

| | | | |
|---|---|---|---|
| 7,130,885 B2 * | 10/2006 | Chandra et al. | 709/206 |
| 2007/0093242 A1 | 4/2007 | Small et al. | |
| 2007/0266101 A1 | 11/2007 | Patel et al. | |
| 2008/0215323 A1 * | 9/2008 | Shaffer et al. | 704/246 |

FOREIGN PATENT DOCUMENTS

KR    20010002764    1/2001

* cited by examiner

*Primary Examiner* — Md S Elahee
(74) *Attorney, Agent, or Firm* — Guntin & Gust, PLC; Andrew Gust

(57) ABSTRACT

A system that incorporates teachings of the present disclosure may include, for example, a Unified Messaging System (UMS) having a controller to receive one or more voicemail, video, or text messages directed to a subscriber of the UMS, present the subscriber one of a first option to convert one of the one or more voicemail messages received in a first media playback format to a second media playback format, and a second option to transfer at least a portion of one or more of the received voicemail, video or text messages received by the UMS to one of a set top box or digital video recorder. The controller is adapted to detect a selection of one of said options, and execute the selected option. Other embodiments are disclosed.

23 Claims, 7 Drawing Sheets

300

SYSTEM AND METHOD FOR PROCESSING MESSAGES

FIELD OF THE DISCLOSURE

The present disclosure relates generally to message management systems and more specifically to a system and method for processing messages.

BACKGROUND

Unified messaging systems can provide subscribers a central service for processing a variety of messages such as email, voicemail, faxes, and so on. Unified messaging systems can also offer their subscribers helpful features such as text to voice presentation of messages and a web portal for managing messages.

DETAILED DESCRIPTION

One embodiment of the present disclosure entails a Unified Messaging System (UMS) having a controller to receive one or more voicemail, video, or text messages directed to a subscriber of the UMS, present the subscriber one of a first option to convert one of the one or more voicemail messages received in a first media playback format to a second media playback format, and a second option to transfer at least a portion of one or more of the received voicemail, video or text messages received by the UMS to one of a set top box or digital video recorder. The controller is adapted to detect a selection of one of said options, and execute the selected option.

Another embodiment of the present disclosure entails a computer-readable storage medium having computer instructions for receiving a voicemail message in a first media playback format, presenting the voicemail message, converting the voicemail message in the first media playback format to a second media playback format, and transmitting to a communication device at least a portion of the voicemail message in the second media playback format.

Yet another embodiment of the present disclosure entails a method operating in a UMS involving presenting a subscriber of the UMS an audio content source, receiving from the audio content source audio content directed to the subscriber, editing audio content as directed by the subscriber, and transmitting the edited audio content to a communication device, wherein the communication device utilizes the edited audio content as a ring tone.

Another embodiment of the present disclosure entails a computer-readable storage medium having computer instructions for receiving one or more voicemail, video, or text messages directed to a subscriber of the UMS, converting one of the one or more voicemail messages received in a first media playback format to a second media playback format as directed by the subscriber, and transmitting the voicemail message in the second media playback format to a communication device identified by the subscriber.

Figure 1:
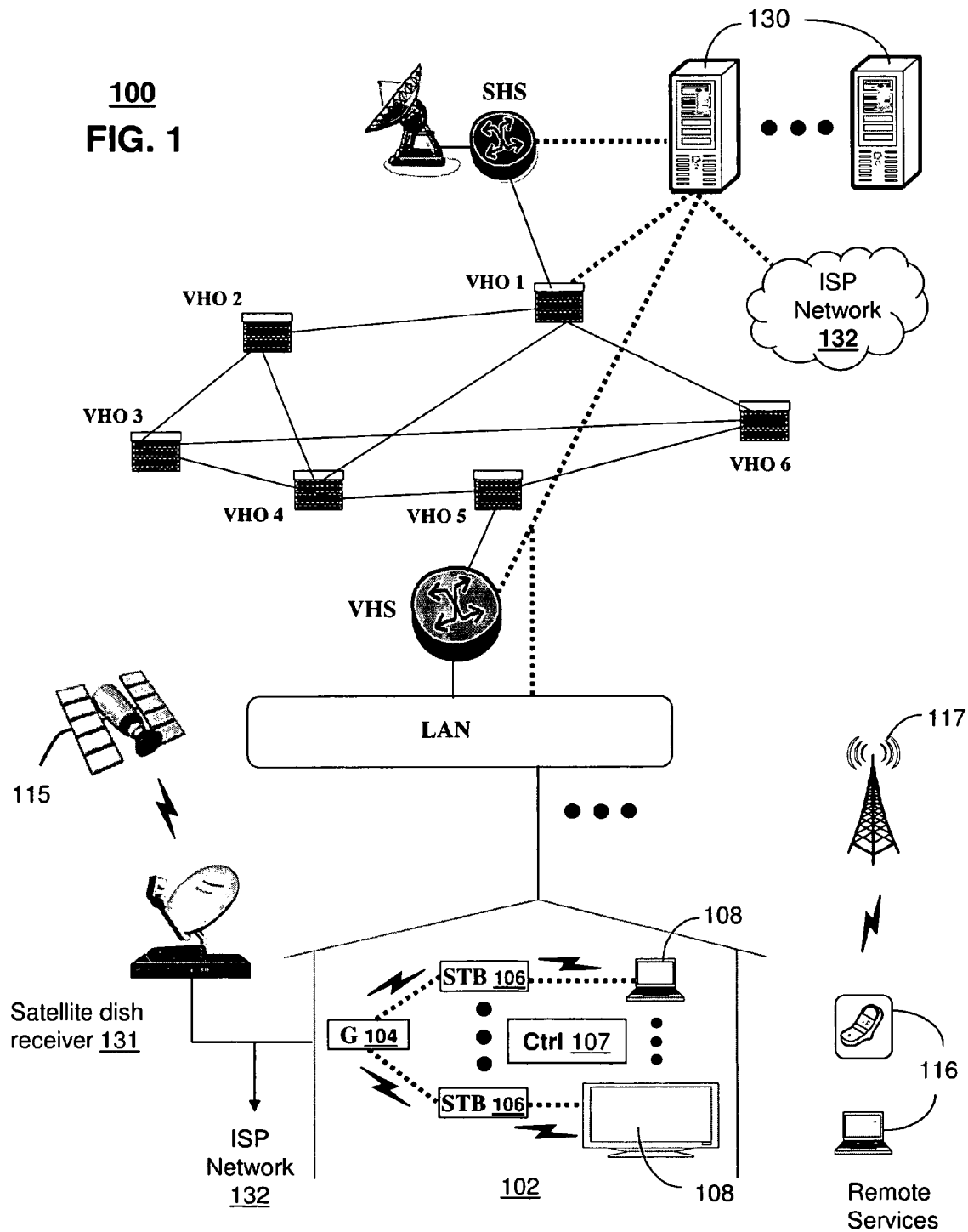
FIGS. 1-4 depict exemplary embodiments of communication systems that provide media services.

FIG. 1 depicts an exemplary embodiment of a first communication system 100 for delivering media content. The communication system 100 can represent an Internet Protocol Television (IPTV) broadcast media system. In a typical IPTV infrastructure, there is at least one super head-end office server (SHS) which receives national media programs from satellite and/or media servers from service providers of multimedia broadcast channels. In the present context, media programs can represent audio content, moving image content such as videos, still image content, and/or combinations thereof. The SHS server forwards IP packets associated with the media content to video head-end servers (VHS) via a network of aggregation points such as video head-end offices (VHO) according to a common multicast communication method.

The VHS then distributes multimedia broadcast programs via a local area network (LAN) to commercial and/or residential buildings 102 housing a gateway 104 (e.g., a residential gateway or RG). The LAN can represent a bank of digital subscriber line access multiplexers (DSLAMs) located in a central office or a service area interface that provide broadband services over optical links or copper twisted pairs to buildings 102. The gateway 104 distributes broadcast signals to media processors 106 such as Set-Top Boxes (STBs) which in turn present broadcast selections to media devices 108 such as computers or television sets managed in some instances by a media controller 107 (e.g., an infrared or RF remote control). Unicast traffic can also be exchanged between the media processors 106 and subsystems of the IPTV media system for services such as video-on-demand (VoD). It will be appreciated by one of ordinary skill in the art that the media devices 108 and/or portable communication devices 116 shown in FIG. 1 can be an integral part of the media processor 106 and can be communicatively coupled to the gateway 104. In this particular embodiment, an integral device such as described can receive, respond, process and present multicast or unicast media content.

The IPTV media system can be coupled to one or more computing devices 130 a portion of which can operate as a web server for providing portal services over an Internet Service Provider (ISP) network 132 to fixed line media devices 108 or portable communication devices 116 by way of a wireless access point 117 providing Wireless Fidelity or WiFi services, or cellular communication services (e.g., GSM, CDMA, UMTS, WiMAX, etc.).

Another distinct portion of the one or more computing devices 130 can be used as a unified messaging system (herein referred to as UMS 130) for offering its subscribers a central point for processing any number of messaging formats such as audio, video, text, and fax messages—just to mention a few.

A satellite broadcast television system can be used in place of the IPTV media system. In this embodiment, signals transmitted by a satellite 115 can be intercepted by a satellite dish receiver 131 coupled to building 102 which conveys media signals to the media processors 106. The media receivers 106 can be equipped with a broadband port to the ISP network 132. Although not shown, the communication system 100 can also be combined or replaced with analog or digital broadcast distributions systems such as cable TV systems.

Figure 2:
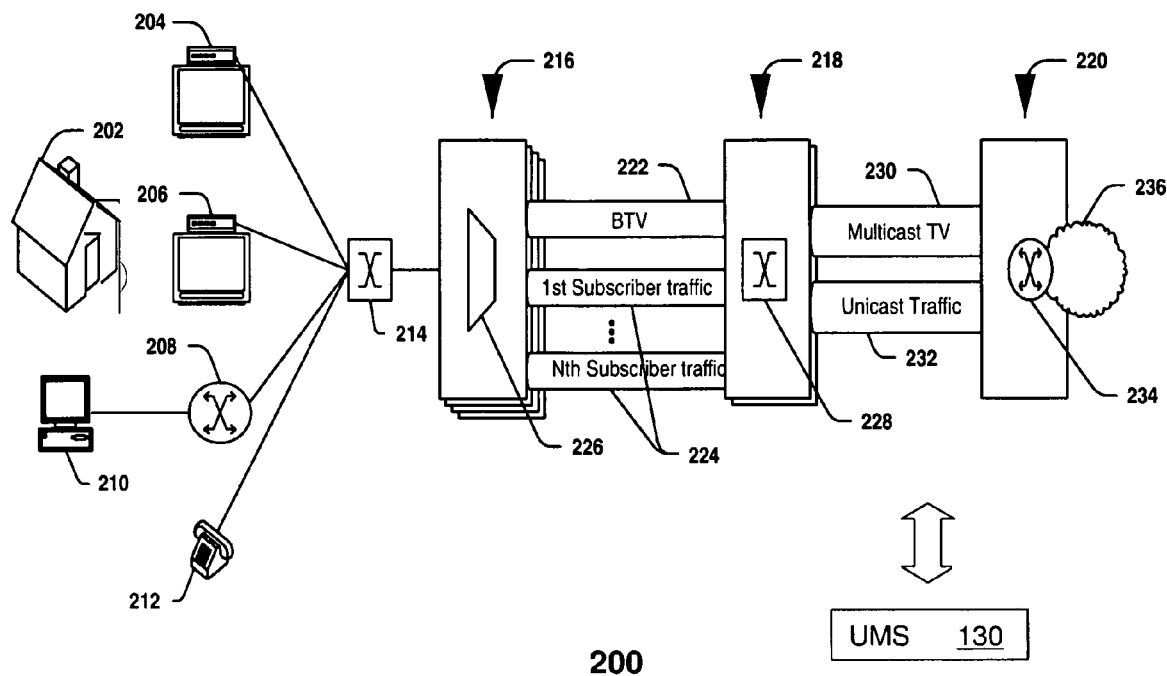

FIG. 2 depicts an exemplary embodiment of a second communication system 200 for delivering media content. Communication system 200 can be overlaid or operably coupled with communication system 100 as another representative embodiment of said communication system. The system 200 includes a distribution switch/router system 228 at a central office 218. The distribution switch/router system 228 receives video data via a multicast television stream 230 from a second distribution switch/router 234 at an intermediate office 220. The multicast television stream 230 includes Internet Protocol (IP) data packets addressed to a multicast IP address associated with a television channel. The distribution switch/router system 228 can cache data associated with each television channel received from the intermediate office 220.

The distribution switch/router system 228 also receives unicast data traffic from the intermediate office 220 via a unicast traffic stream 232. The unicast traffic stream 232 includes data packets related to devices located at a particular residence, such as the residence 202. For example, the unicast traffic stream 232 can include data traffic related to a digital subscriber line, a telephone line, another data connection, or any combination thereof. To illustrate, the unicast traffic stream 232 can communicate data packets to and from a telephone 212 associated with a subscriber at the residence 202. The telephone 212 can be a Voice over Internet Protocol (VOIP) telephone. To further illustrate, the unicast traffic stream 232 can communicate data packets to and from a personal computer 210 at the residence 202 via one or more data routers 208. In an additional illustration, the unicast traffic stream 232 can communicate data packets to and from a set-top box device, such as the set-top box devices 204, 206. The unicast traffic stream 232 can communicate data packets to and from the devices located at the residence 202 via one or more residential gateways 214 associated with the residence 202.

The distribution switch/router system 228 can send data to one or more access switch/router systems 226. The access switch/router system 226 can include or be included within a service area interface 216. In a particular embodiment, the access switch/router system 226 can include a DSLAM. The access switch/router system 226 can receive data from the distribution switch/router system 228 via a broadcast television (BTV) stream 222 and a plurality of unicast subscriber traffic streams 224. The BTV stream 222 can be used to communicate video data packets associated with a multicast stream.

For example, the BTV stream 222 can include a multicast virtual local area network (VLAN) connection between the distribution switch/router system 228 and the access switch/router system 226. Each of the plurality of subscriber traffic streams 224 can be used to communicate subscriber specific data packets. For example, the first subscriber traffic stream can communicate data related to a first subscriber, and the nth subscriber traffic stream can communicate data related to an nth subscriber. Each subscriber to the system 200 can be associated with a respective subscriber traffic stream 224. The subscriber traffic stream 224 can include a subscriber VLAN connection between the distribution switch/router system 228 and the access switch/router system 226 that is associated with a particular set-top box device 204, 206, a particular residence 202, a particular residential gateway 214, another device associated with a subscriber, or any combination thereof.

In an illustrative embodiment, a set-top box device, such as the set-top box device 204, receives a channel change command from an input device, such as a remote control device. The channel change command can indicate selection of an IPTV channel. After receiving the channel change command, the set-top box device 204 generates channel selection data that indicates the selection of the IPTV channel. The set-top box device 204 can send the channel selection data to the access switch/router system 226 via the residential gateway 214. The channel selection data can include an Internet Group Management Protocol (IGMP) Join request. In an illustrative embodiment, the access switch/router system 226 can identify whether it is joined to a multicast group associated with the requested channel based on information in the IGMP Join request.

If the access switch/router system 226 is not joined to the multicast group associated with the requested channel, the access switch/router system 226 can generate a multicast stream request. The multicast stream request can be generated by modifying the received channel selection data. In an illustrative embodiment, the access switch/router system 226 can modify an IGMP Join request to produce a proxy IGMP Join request. The access switch/router system 226 can send the multicast stream request to the distribution switch/router system 228 via the BTV stream 222. In response to receiving the multicast stream request, the distribution switch/router system 228 can send a stream associated with the requested channel to the access switch/router system 226 via the BTV stream 222.

The UMS 130 of FIG. 1 can be operably coupled to the second communication system 200 for purposes similar to those described above.

Figure 3:
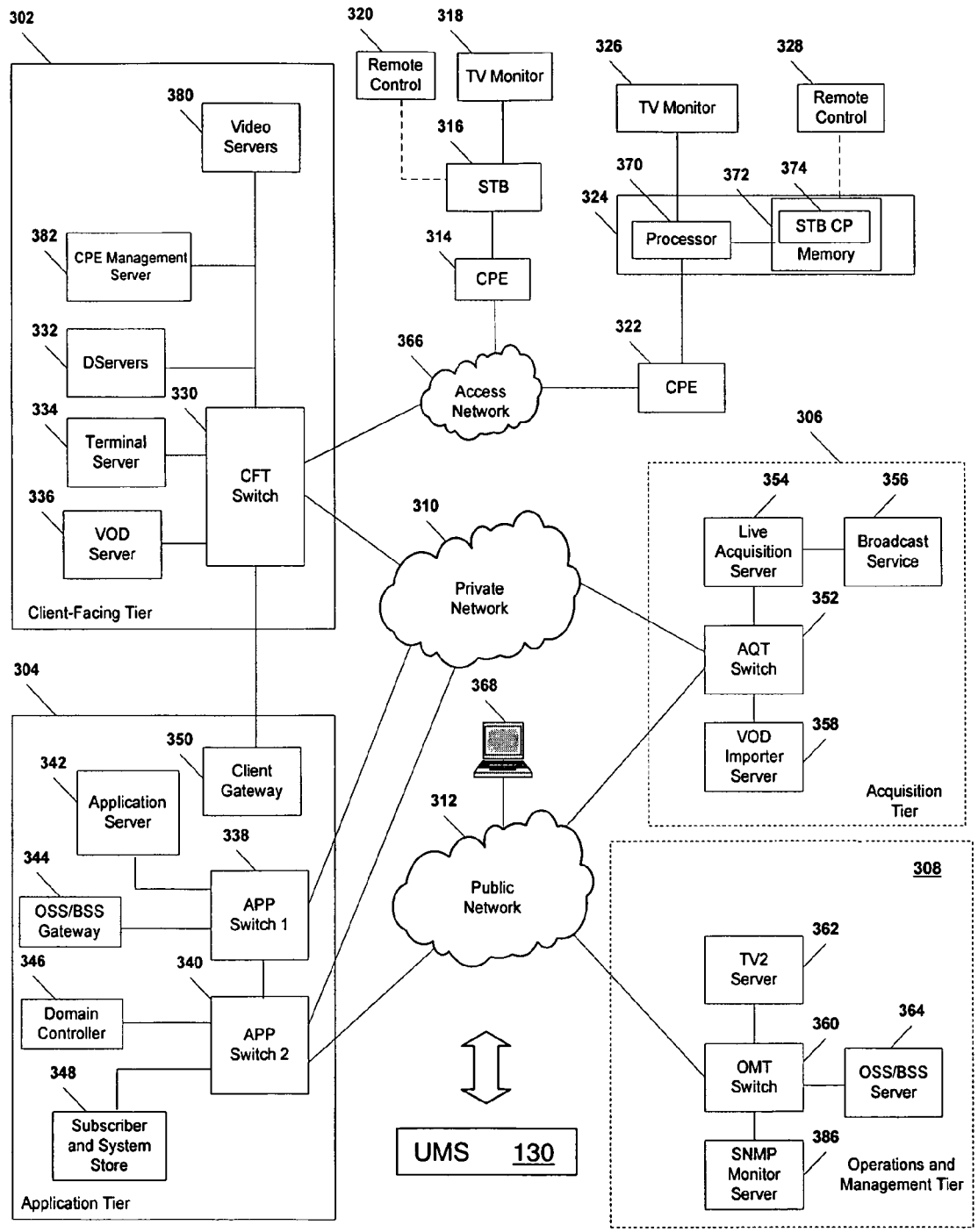

FIG. 3 depicts an exemplary embodiment of a third communication system 300 for delivering media content. Communication system 300 can be overlaid or operably coupled with communication systems 100-200 as another representative embodiment of said communication systems. As shown, the system 300 can include a client facing tier 302, an application tier 304, an acquisition tier 306, and an operations and management tier 308. Each tier 302, 304, 306, 308 is coupled to a private network 310, such as a network of common packet-switched routers and/or switches; to a public network 312, such as the Internet; or to both the private network 310 and the public network 312. For example, the client-facing tier 302 can be coupled to the private network 310. Further, the application tier 304 can be coupled to the private network 310 and to the public network 312. The acquisition tier 306 can also be coupled to the private network 310 and to the public network 312. Additionally, the operations and management tier 308 can be coupled to the public network 312.

As illustrated in FIG. 3, the various tiers 302, 304, 306, 308 communicate with each other via the private network 310 and the public network 312. For instance, the client-facing tier 302 can communicate with the application tier 304 and the acquisition tier 306 via the private network 310. The application tier 304 can communicate with the acquisition tier 306 via the private network 310. Further, the application tier 304 can communicate with the acquisition tier 306 and the operations and management tier 308 via the public network 312. Moreover, the acquisition tier 306 can communicate with the operations and management tier 308 via the public network 312. In a particular embodiment, elements of the application tier 304, including, but not limited to, a client gateway 350, can communicate directly with the client-facing tier 302.

The client-facing tier 302 can communicate with user equipment via an access network 366, such as an IPTV access network. In an illustrative embodiment, customer premises equipment (CPE) 314, 322 can be coupled to a local switch, router, or other device of the access network 366. The client-facing tier 302 can communicate with a first representative set-top box device 316 via the first CPE 314 and with a second representative set-top box device 324 via the second CPE 322. In a particular embodiment, the first representative set-top box device 316 and the first CPE 314 can be located at a first customer premise, and the second representative set-top box device 324 and the second CPE 322 can be located at a second customer premise.

In another particular embodiment, the first representative set-top box device 316 and the second representative set-top box device 324 can be located at a single customer premise, both coupled to one of the CPE 314, 322. The CPE 314, 322 can include routers, local area network devices, modems, such as digital subscriber line (DSL) modems, any other suitable devices for facilitating communication between a set-top box device and the access network 366, or any combination thereof.

In an exemplary embodiment, the client-facing tier 302 can be coupled to the CPE 314, 322 via fiber optic cables. In another exemplary embodiment, the CPE 314, 322 can include DSL modems that are coupled to one or more network nodes via twisted pairs, and the client-facing tier 302 can be coupled to the network nodes via fiber-optic cables. Each set-top box device 316, 324 can process data received via the access network 366, via a common IPTV software platform.

The first set-top box device 316 can be coupled to a first external display device, such as a first television monitor 318, and the second set-top box device 324 can be coupled to a second external display device, such as a second television monitor 326. Moreover, the first set-top box device 316 can communicate with a first remote control 320, and the second set-top box device 324 can communicate with a second remote control 328. The set-top box devices 316, 324 can include IPTV set-top box devices; video gaming devices or consoles that are adapted to receive IPTV content; personal computers or other computing devices that are adapted to emulate set-top box device functionalities; any other device adapted to receive IPTV content and transmit data to an IPTV system via an access network; or any combination thereof.

In an exemplary, non-limiting embodiment, each set-top box device 316, 324 can receive data, video, or any combination thereof, from the client-facing tier 302 via the access network 366 and render or display the data, video, or any combination thereof, at the display device 318, 326 to which it is coupled. In an illustrative embodiment, the set-top box devices 316, 324 can include tuners that receive and decode television programming signals or packet streams for transmission to the display devices 318, 326. Further, the set-top box devices 316, 324 can each include a STB processor 370 and a STB memory device 372 that is accessible to the STB processor 370. In one embodiment, a computer program, such as the STB computer program 374, can be embedded within the STB memory device 372.

In an illustrative embodiment, the client-facing tier 302 can include a client-facing tier (CFT) switch 330 that manages communication between the client-facing tier 302 and the access network 366 and between the client-facing tier 302 and the private network 310. As illustrated, the CFT switch 330 is coupled to one or more distribution servers, such as Distribution-servers (D-servers) 332, that store, format, encode, replicate, or otherwise manipulate or prepare video content for communication from the client-facing tier 302 to the set-top box devices 316, 324. The CFT switch 330 can also be coupled to a terminal server 334 that provides terminal devices with a point of connection to the IPTV system 300 via the client-facing tier 302.

In a particular embodiment, the CFT switch 330 can be coupled to a VoD server 336 that stores or provides VoD content imported by the IPTV system 300. Further, the CFT switch 330 is coupled to one or more video servers 380 that receive video content and transmit the content to the set-top boxes 316, 324 via the access network 366. The client-facing tier 302 may include a CPE management server 382 that manages communications to and from the CPE 314 and the CPE 322. For example, the CPE management server 382 may collect performance data associated with the set-top box devices 316, 324 from the CPE 314 or the CPE 322 and forward the collected performance data to a server associated with the operations and management tier 308.

In an illustrative embodiment, the client-facing tier 302 can communicate with a large number of set-top boxes, such as the representative set-top boxes 316, 324, over a wide geographic area, such as a metropolitan area, a viewing area, a statewide area, a regional area, a nationwide area or any other suitable geographic area, market area, or subscriber or customer group that can be supported by networking the client-facing tier 302 to numerous set-top box devices. In a particular embodiment, the CFT switch 330, or any portion thereof, can include a multicast router or switch that communicates with multiple set-top box devices via a multicast-enabled network.

As illustrated in FIG. 3, the application tier 304 can communicate with both the private network 310 and the public network 312. The application tier 304 can include a first application tier (APP) switch 338 and a second APP switch 340. In a particular embodiment, the first APP switch 338 can be coupled to the second APP switch 340. The first APP switch 338 can be coupled to an application server 342 and to an OSS/BSS gateway 344. In a particular embodiment, the application server 342 can provide applications to the set-top box devices 316, 324 via the access network 366, which enable the set-top box devices 316, 324 to provide functions, such as interactive program guides, video gaming, display, messaging, processing of VoD material and other IPTV content, etc. In an illustrative embodiment, the application server 342 can provide location information to the set-top box devices 316, 324. In a particular embodiment, the OSS/BSS gateway 344 includes operation systems and support (OSS) data, as well as billing systems and support (BSS) data. In one embodiment, the OSS/BSS gateway 344 can provide or restrict access to an OSS/BSS server 364 that stores operations and billing systems data.

The second APP switch 340 can be coupled to a domain controller 346 that provides Internet access, for example, to users at their computers 368 via the public network 312. For example, the domain controller 346 can provide remote Internet access to IPTV account information, e-mail, personalized Internet services, or other online services via the public network 312. In addition, the second APP switch 340 can be coupled to a subscriber and system store 348 that includes account information, such as account information that is associated with users who access the IPTV system 300 via the private network 310 or the public network 312. In an illustrative embodiment, the subscriber and system store 348 can store subscriber or customer data and create subscriber or customer profiles that are associated with IP addresses, stock-keeping unit (SKU) numbers, other identifiers, or any combination thereof, of corresponding set-top box devices 316, 324. In another illustrative embodiment, the subscriber and system store can store data associated with capabilities of set-top box devices associated with particular customers.

In a particular embodiment, the application tier 304 can include a client gateway 350 that communicates data directly to the client-facing tier 302. In this embodiment, the client gateway 350 can be coupled directly to the CFT switch 330. The client gateway 350 can provide user access to the private network 310 and the tiers coupled thereto. In an illustrative embodiment, the set-top box devices 316, 324 can access the IPTV system 300 via the access network 366, using information received from the client gateway 350. User devices can access the client gateway 350 via the access network 366, and the client gateway 350 can allow such devices to access the private network 310 once the devices are authenticated or verified. Similarly, the client gateway 350 can prevent unauthorized devices, such as hacker computers or stolen set-top box devices from accessing the private network 310, by denying access to these devices beyond the access network 366.

For example, when the first representative set-top box device 316 accesses the client-facing tier 302 via the access network 366, the client gateway 350 can verify subscriber information by communicating with the subscriber and system store 348 via the private network 310. Further, the client gateway 350 can verify billing information and status by communicating with the OSS/BSS gateway 344 via the private network 310. In one embodiment, the OSS/BSS gateway 344 can transmit a query via the public network 312 to the OSS/BSS server 364. After the client gateway 350 confirms subscriber and/or billing information, the client gateway 350 can allow the set-top box device 316 to access IPTV content and VoD content at the client-facing tier 302. If the client gateway 350 cannot verify subscriber information for the set-top box device 316, e.g., because it is connected to an unauthorized twisted pair, the client gateway 350 can block transmissions to and from the set-top box device 316 beyond the access network 366.

As indicated in FIG. 3, the acquisition tier 306 includes an acquisition tier (AQT) switch 352 that communicates with the private network 310. The AQT switch 352 can also communicate with the operations and management tier 308 via the public network 312. In a particular embodiment, the AQT switch 352 can be coupled to one or more live Acquisition-servers (A-servers) 354 that receive or acquire television content, movie content, advertisement content, other video content, or any combination thereof, from a broadcast service 356, such as a satellite acquisition system or satellite head-end office. In a particular embodiment, the live acquisition server 354 can transmit content to the AQT switch 352, and the AQT switch 352 can transmit the content to the CFT switch 330 via the private network 310.

In an illustrative embodiment, content can be transmitted to the D-servers 332, where it can be encoded, formatted, stored, replicated, or otherwise manipulated and prepared for communication from the video server(s) 380 to the set-top box devices 316, 324. The CFT switch 330 can receive content from the video server(s) 380 and communicate the content to the CPE 314, 322 via the access network 366. The set-top box devices 316, 324 can receive the content via the CPE 314, 322, and can transmit the content to the television monitors 318, 326. In an illustrative embodiment, video or audio portions of the content can be streamed to the set-top box devices 316, 324.

Further, the AQT switch 352 can be coupled to a video-on-demand importer server 358 that receives and stores television or movie content received at the acquisition tier 306 and communicates the stored content to the VoD server 336 at the client-facing tier 302 via the private network 310. Additionally, at the acquisition tier 306, the VoD importer server 358 can receive content from one or more VoD sources outside the IPTV system 300, such as movie studios and programmers of non-live content. The VoD importer server 358 can transmit the VoD content to the AQT switch 352, and the AQT switch 352, in turn, can communicate the material to the CFT switch 330 via the private network 310. The VoD content can be stored at one or more servers, such as the VoD server 336.

When users issue requests for VoD content via the set-top box devices 316, 324, the requests can be transmitted over the access network 366 to the VoD server 336, via the CFT switch 330. Upon receiving such requests, the VoD server 336 can retrieve the requested VoD content and transmit the content to the set-top box devices 316, 324 across the access network 366, via the CFT switch 330. The set-top box devices 316, 324 can transmit the VoD content to the television monitors 318, 326. In an illustrative embodiment, video or audio portions of VoD content can be streamed to the set-top box devices 316, 324.

FIG. 3 further illustrates that the operations and management tier 308 can include an operations and management tier (OMT) switch 360 that conducts communication between the operations and management tier 308 and the public network 312. In the embodiment illustrated by FIG. 3, the OMT switch 360 is coupled to a TV2 server 362. Additionally, the OMT switch 360 can be coupled to an OSS/BSS server 364 and to a simple network management protocol monitor 386 that monitors network devices within or coupled to the IPTV system 300. In a particular embodiment, the OMT switch 360 can communicate with the AQT switch 352 via the public network 312.

The OSS/BSS server 364 may include a cluster of servers, such as one or more CPE data collection servers that are adapted to request and store operations systems data, such as performance data from the set-top box devices 316, 324. In an illustrative embodiment, the CPE data collection servers may be adapted to analyze performance data to identify a condition of a physical component of a network path associated with a set-top box device, to predict a condition of a physical component of a network path associated with a set-top box device, or any combination thereof.

In an illustrative embodiment, the live acquisition server 354 can transmit content to the AQT switch 352, and the AQT switch 352, in turn, can transmit the content to the OMT switch 360 via the public network 312. In this embodiment, the OMT switch 360 can transmit the content to the TV2 server 362 for display to users accessing the user interface at the TV2 server 362. For example, a user can access the TV2 server 362 using a personal computer 368 coupled to the public network 312.

The UMS 130 of FIGS. 1-2 can be operably coupled to the third communication system 300 for purposes similar to those described above.

It should be apparent to one of ordinary skill in the art from the foregoing media communication system embodiments that other suitable media communication systems for distributing broadcast media content as well as peer-to-peer exchange of content can be applied to the present disclosure.

Figure 4:
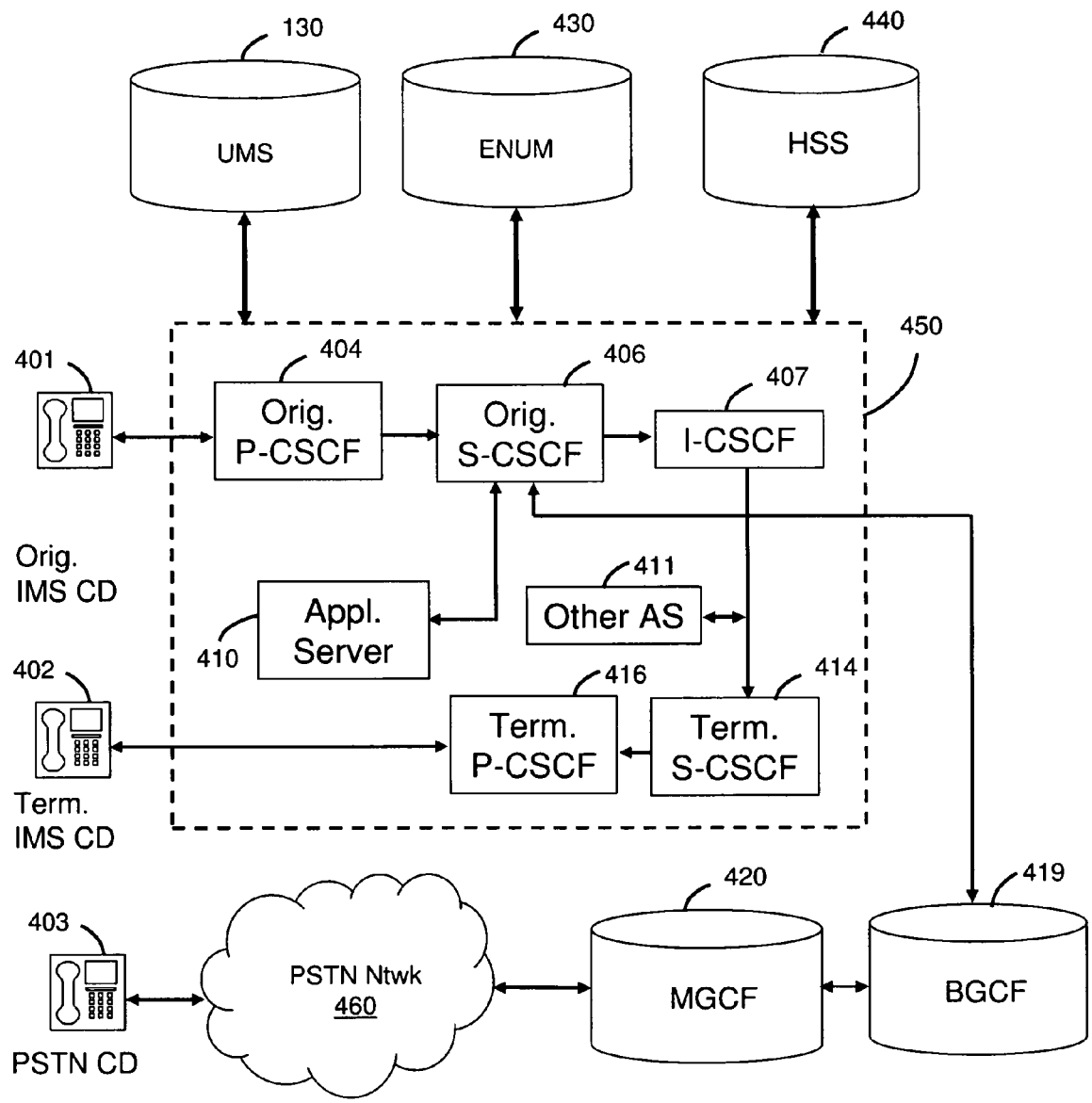

FIG. 4 depicts an exemplary embodiment of a communication system 400 employing an IP Multimedia Subsystem (IMS) network architecture. Communication system 400 can be overlaid or operably coupled with communication systems 100-300 as another representative embodiment of said communication systems.

The communication system 400 can comprise a Home Subscriber Server (HSS) 440, a tElephone NUmber Mapping (ENUM) server 430, and network elements of an IMS network 450. The IMS network 450 can be coupled to IMS compliant communication devices (CD) 401, 402 or a Public Switched Telephone Network (PSTN) CD 403 using a Media Gateway Control Function (MGCF) 420 that connects the call through a common PSTN network 460.

IMS CDs 401, 402 register with the IMS network 450 by contacting a Proxy Call Session Control Function (P-CSCF) which communicates with a corresponding Serving CSCF (S-CSCF) to register the CDs with an Authentication, Authorization and Accounting (AAA) supported by the HSS 440.

To accomplish a communication session between CDs, an originating IMS CD 401 can submit a Session Initiation Protocol (SIP INVITE) message to an originating P-CSCF 404 which communicates with a corresponding originating S-CSCF 406. The originating S-CSCF 406 can submit the SIP INVITE message to an application server (AS) such as reference 410 that can provide a variety of services to IMS subscribers. For example, the application server 410 can be used to perform originating treatment functions on the calling party number received by the originating S-CSCF 406 in the SIP INVITE message.

Originating treatment functions can include determining whether the calling party number has international calling services, and/or is requesting special telephony features (e.g., *72 forward calls, *73 cancel call forwarding, *67 for caller ID blocking, and so on). Additionally, the originating S-CSCF 406 can submit queries to the ENUM system 430 to translate an E. 164 telephone number to a SIP Uniform Resource Identifier (URI) if the targeted communication device is IMS compliant. If the targeted communication device is a PSTN device, the ENUM system 430 will respond with an unsuccessful address resolution and the S-CSCF 406 will forward the call to the MGCF 420 via a Breakout Gateway Control Function (BGCF) 419.

When the ENUM server 430 returns a SIP URI, the SIP URI is used by an Interrogating CSCF (I-CSCF) 407 to submit a query to the HSS 440 to identify a terminating S-CSCF 414 associated with a terminating IMS CD such as reference 402. Once identified, the I-CSCF 407 can submit the SIP INVITE to the terminating S-CSCF 414 which can call on an application server 411 similar to reference 410 to perform the originating treatment telephony functions described earlier. The terminating S-CSCF 414 can then identify a terminating P-CSCF 416 associated with the terminating CD 402. The P-CSCF 416 then signals the CD 402 to establish communications. The aforementioned process is symmetrical. Accordingly, the terms "originating" and "terminating" in FIG. 4 can be interchanged.

IMS network 450 can also be operably coupled to the UMS 130 previously discussed for FIG. 1. In this representative embodiment, the UMS 130 can operate as an IMS-compliant device coupled to the communication system 400. The UMS 130 can process PSTN as well as VoIP messages.

Figure 5:
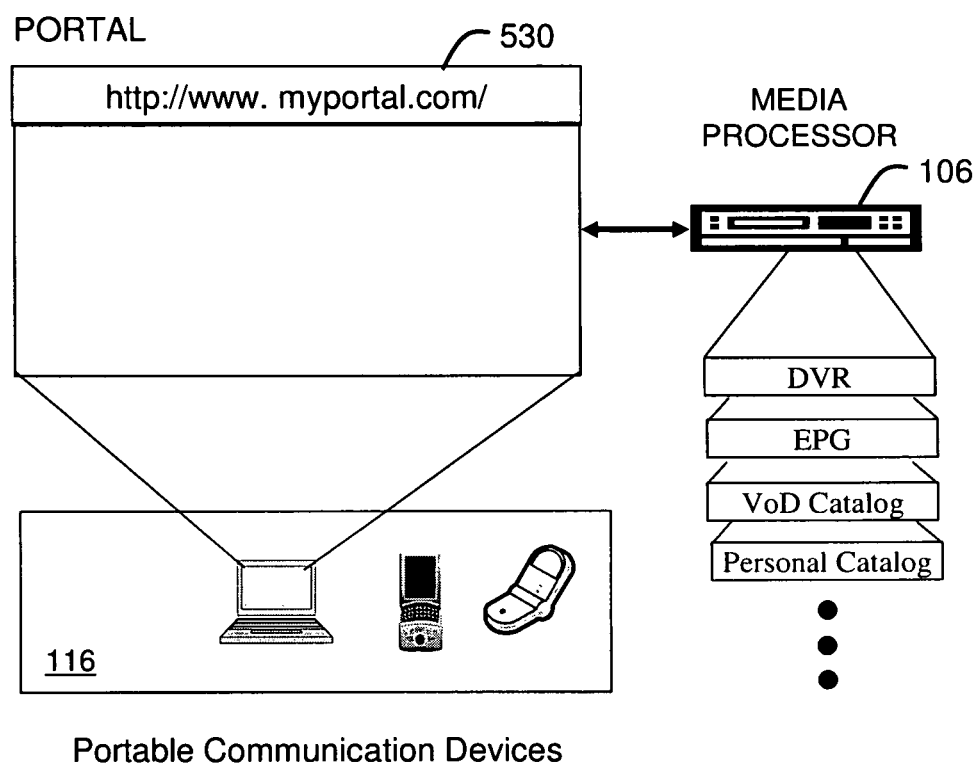
FIG. 5 depicts an exemplary embodiment of a portal interacting with at least one among the communication systems of FIGS. 1-4.

FIG. 5 depicts an exemplary embodiment of a portal 530. The portal 530 can be used for managing services of communication systems 100-400. The portal 530 can be accessed by a Uniform Resource Locator (URL) with a common Internet browser such as Microsoft's Internet Explorer using an Internet-capable communication device such as references 108, 116, or 210 of FIGS. 1-2. The portal 530 can be configured to access a media processor such as references 106, 204, 206, 316, and 324 of FIGS. 1-3 and services managed thereby such as a Digital Video Recorder (DVR), an Electronic Programming Guide (EPG), VoD catalog, a personal catalog stored in the STB (e.g., personal videos, pictures, audio recordings, etc.), and so on.

Figure 6:
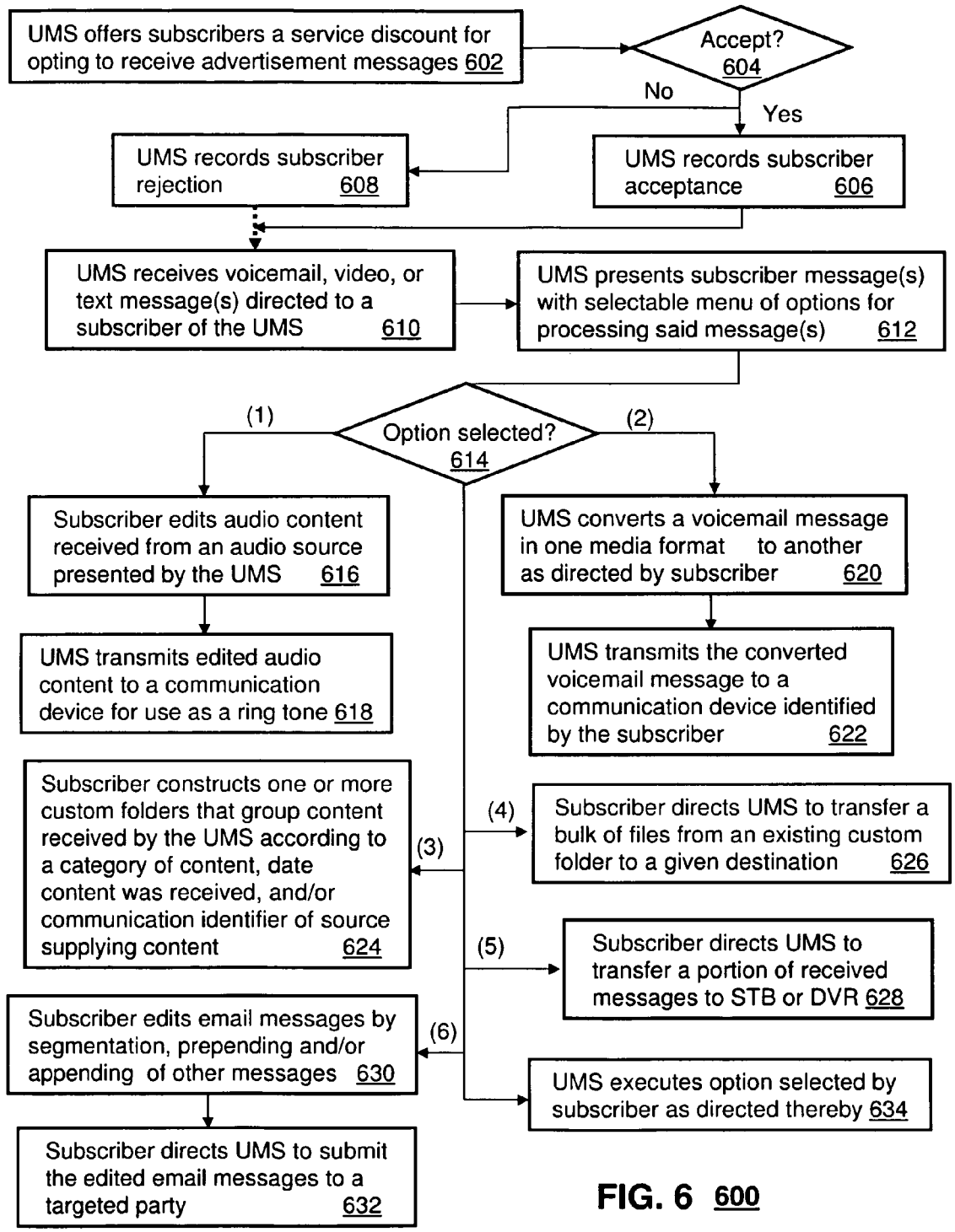
FIG. 6 depicts an exemplary method operating in portions of the communication systems of FIGS. 1-4.

FIG. 6 depicts an exemplary method 600 operating in portions of communication systems 100-400. Method 600 begins with step 602 in which the UMS 130 offers subscribers a service discount for opting to receive advertisement messages from the UMS. In step 604, the UMS 130 receives a response and determines therefor whether to record an acceptance of the offer in step 606 or a rejection in step 608. If the offer is accepted, the recording of the acceptance by the UMS 130 can also prompt a billing system to effectuate the service fee discount as directed by the UMS. The discount can be a fixed fee discount or a fee discount which arises from a frequency of selection of advertisements by the subscriber. The service fee discount can also be varied according to purchases made responsive to an advertisement. Steps 602-608 can represent configuration steps which can arise for a first-time use of services of the UMS 130 by a subscriber, or after a first time use responsive to the UMS 130 submitting additional promotions to subscribers.

In step 610, the UMS 130 can receive voicemail (or other forms of audio content), video content, and/or text messages directed to the subscriber of the UMS 130. In step 612, the UMS 130 can present the messages received with a selectable menu of options for processing said messages. If the user opted to accept advertisements, the UMS 130 can also interlace advertisements with the presentation of said messages. The subscriber can select the advertisements which may navigate the subscriber to other sources of content such as, for example, a music store for purchasing audio content.

In one illustrative embodiment, the UMS 130 can be programmed to offer the subscriber a service to edit audio content received from an audio source (e.g., music store, public domain audio content, etc.). The UMS 130 can utilize common audio editing technology to provide the subscriber in step 616 a means to extract or remove a portion of audio content, and/or combine or mix the audio content being edited with other audio content (e.g., subscriber's voice, other music, etc.). This service can provide the subscriber a means to customize audio content as desired. In an illustrative embodiment, the subscriber can direct the UMS 130 in step 618 to transmit the audio content to a communication device (mobile, cordless, or otherwise) for use as a ring tone. The edited audio content can have other uses such as, for example, utilizing it in ring-back tones, greeting messages for voicemail, etc.

In another illustrative embodiment, the UMS 130 can be programmed to offer the subscriber a service to convert the media playback format of one voicemail message to another media playback format. For example, if a voicemail message is presented in a Windows Media Audio (WMA) format, the subscriber can request that the UMS 130 convert this format to a Moving Picture Experts Group (MPEG) format such as MPEG-3. The UMS 130 can be directed by the subscriber to convert between other media playback formats commonly known or proposed in the future. The UMS 130 can utilize common media playback format conversion technology to perform these conversions. Additionally, the UMS 130 can be directed to convert media files received in email, or other transport mechanisms to other formats. In the present illustration, however, the UMS 130 is directed in step 620 to convert a voicemail message in a first media playback format (e.g., WMA) to a second media playback format (e.g., MPEG-3). In step 622, the subscriber can for example direct the UMS 130 to transmit the converted voicemail message to a communication device identified by the subscriber (subscriber's computer, cell phone, etc.).

In yet another illustrative embodiment, the UMS 130 can offer the subscriber a service to construct one or more customer folders for retaining messages directed to the subscriber. The subscriber can direct the UMS 130 in step 624 to group content in the customized folders according to a category of content (email, voicemail, SMS messages, MMS messages, etc.), date content was received, and/or a communication identifier of the source supplying the content (e.g., caller ID, email address, SIP URI, etc.). These designations can be created singly or in combination. Example, messages from Mom or Dad are directed to a Parents folder. Messages from Mom or Dad can be identified by one or more email addresses, phone numbers (e.g., home phone, mobile phone), instant messaging address, and so on. Similar designations can be made for random or miscellaneous messages. For example, messages with audio content can be stored in a specific folder, while messages with video content can be stored in another designated folder. The UMS 130 can be programmed to screen the content received to determine whether it is audio, video, or otherwise to segregate messages received thereby.

In addition to creating these custom folders, the UMS 130 can offer a subscriber in step 626 an option to transfer a bulk of media files from an existing custom folder to a given destination. The bulk transfer can include media files in a flat custom folder, or a custom folder with nested subdirectories of folders. Additionally, the bulk transfer can maintain the directory structure of the original custom folder at the given destination. The destination can be another custom folder created by the subscriber in the UMS 130 or a remote device capable of storing media files (e.g., the subscriber's personal computer, a remote backup storage facility, etc.).

In yet another illustrative embodiment the UMS 130 can offer the subscriber a service in step 628 for transferring a portion of the messages received by the UMS to the subscriber's STB or DVR. The transfer can take place in bulk form as described above for step 626. In this embodiment, the STB or DVR can present as directed by the subscriber the one or more of the media files transferred from the UMS 130 on a display device (e.g., Television, computer accessible on a local area network, etc.).

In another illustrative embodiment the UMS 130 can be programmed to offer the subscriber a service in step 630 for editing email messages by providing the user the ability to segment these messages (e.g., extract or delete portions thereof), prepend or append other messages thereto, which the subscriber can direct the UMS to submit to other targeted parties in step 632.

The foregoing features can be executed by the UMS 130 in step 634 according to the option (or combination of options) selected by the subscriber.

Upon reviewing the aforementioned embodiments, it would be evident to an artisan with ordinary skill in the art that said embodiments can be modified, reduced, or enhanced without departing from the scope and spirit of the claims described below. Accordingly, the reader is directed to the claims section for a fuller understanding of the breadth and scope of the present disclosure.

Figure 7:
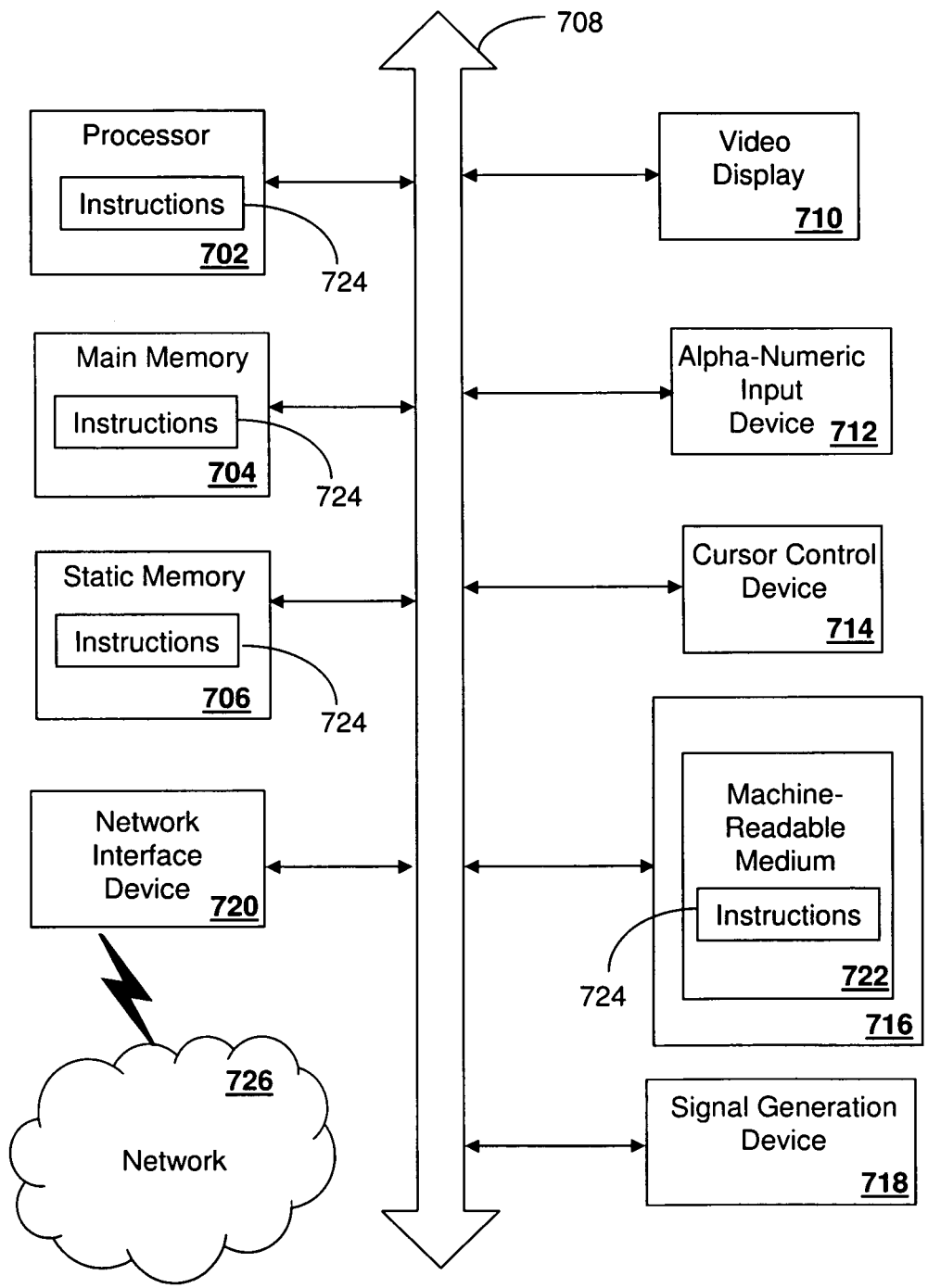
FIG. 7 is a diagrammatic representation of a machine in the form of a computer system within which a set of instructions, when executed, may cause the machine to perform any one or more of the methodologies discussed herein.

FIG. 7 depicts an exemplary diagrammatic representation of a machine in the form of a computer system 700 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 700 may include a processor 702 (e.g., a central processing unit (CPU), a graphics processing unit (GPU, or both), a main memory 704 and a static memory 706, which communicate with each other via a bus 708. The computer system 700 may further include a video display unit 710 (e.g., a liquid crystal display (LCD), a flat panel, a solid state display, or a cathode ray tube (CRT)). The computer system 700 may include an input device 712 (e.g., a keyboard), a cursor control device 714 (e.g., a mouse), a disk drive unit 716, a signal generation device 718 (e.g., a speaker or remote control) and a network interface device 720.

The disk drive unit 716 may include a machine-readable medium 722 on which is stored one or more sets of instructions (e.g., software 724) embodying any one or more of the methodologies or functions described herein, including those methods illustrated above. The instructions 724 may also reside, completely or at least partially, within the main memory 704, the static memory 706, and/or within the processor 702 during execution thereof by the computer system 700. The main memory 704 and the processor 702 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 724, or that which receives and executes instructions 724 from a propagated signal so that a device connected to a network environment 726 can send or receive voice, video or data, and to communicate over the network 726 using the instructions 724. The instructions 724 may further be transmitted or received over a network 726 via the network interface device 720.

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A messaging system, comprising:
a memory storing computer instructions; and
a controller coupled with the memory, wherein the controller when executing the computer instructions performs a method, the method comprising:
storing in the memory a group of messages that are associated with a subscriber device, wherein the group of messages includes video content;
receiving a first message directed to the subscriber device, wherein the first message includes first video content;
storing in the memory the first message having the first video content in a first media playback format;
receiving first user input from the subscriber device comprising a request to delete a portion of the first message;
generating a first adjusted message by deleting the portion of the first message responsive to the first user input;
receiving second user input from the subscriber device comprising a request for a format conversion;
responsive to the request for the format conversion, converting the first adjusted message and the first video content to a second media playback format;
receiving second user input from the subscriber device comprising a selection of a second message having a second video content from the group of messages;
generating an aggregated message by appending the second message having the second video content to the first adjusted message having the first video content; and
providing the aggregated message in the second media playback format to a set top box for presentation at a display device connected with the set top box.

2. The messaging system of claim 1, wherein the controller when executing the computer instructions performs the method comprising providing to the subscriber device an option to customize folders to group the first and second messages in the memory.

3. The messaging system of claim 2, wherein the folders group content according to a date content was received by the controller and communication identifiers associated with sources supplying content to the controller.

4. The messaging system of claim 3, wherein the communication identifiers comprises one of a telephone number or a session initiation protocol uniform resource identifier.

5. The messaging system of claim 2, wherein the controller when executing the computer instructions performs the method comprising providing to the subscriber device another option to transfer files in bulk from one of the folders to a given destination.

6. The messaging system of claim 1, wherein the controller when executing the computer instructions performs the method comprising presenting the subscriber an option to:
generate edited audio content by editing audio content purchased via the subscriber device from an audio content source; and
transmit the edited audio content to a communication device, wherein the communication device utilizes the edited audio content as a ring tone.

7. The messaging system of claim 1, wherein the controller when executing the computer instructions performs the method comprising providing to the subscriber device another option to edit email messages by segmenting portions thereof.

8. The messaging system of claim 1, wherein the controller when executing the computer instructions performs the method comprising providing to the subscriber an option to receive a service discount for opting to accept presentations of advertisement messages while utilizing services provided by the controller.

9. The messaging system of claim 1, wherein the controller when executing the computer instructions performs the method comprising transmitting the first message in the second media playback format to a communication device identified by the subscriber device.

10. The messaging system of claim 9, wherein the controller when executing the computer instructions performs the method comprising:
analyzing content associated with each message of the group of messages to determine a corresponding category for each message;
storing the group of messages according to the corresponding category; and
retrieving the second message from the group of messages utilizing the corresponding category.

11. The messaging system of claim 1, wherein the controller operates in an Internet Protocol Multimedia Subsystem communication network.

12. A non-transitory computer-readable storage medium, comprising computer instructions which when executed by a processor cause the processor to perform a method, the method comprising:
receiving a message including first video content in a first media playback format;
storing in a memory device the message including the first video content in the first media playback format;
responsive to receiving user input, converting the first video content in the first media playback format to a second media playback format;
generating a modified message by deleting a portion of the message based on user instructions;
appending to the modified message, second video content extracted from an other message that is selected from a group of messages being stored in the memory device, wherein the second video content is only a portion of video content of the other message; and
transmitting to a communication device the modified message and the first and second video content in the second media playback format for presentation at a display device connected to the communication device.

13. The non-transitory computer-readable storage medium of claim 12, which when executed by the processor cause the processor to perform the method comprising:
analyzing content associated with each message of the group of messages to determine a corresponding category for each message;
storing the group of messages according to the corresponding category; and
retrieving the other message from the group of messages utilizing the corresponding category, wherein the communication device is a set top box.

14. The non-transitory computer-readable storage medium of claim 12, comprising computer instructions which when executed by the processor cause the processor to perform the method comprising extracting a portion of the message for use as a greeting.

15. A method, comprising:
receiving a message at a server that is directed to a subscriber device, wherein the message includes first video content in a first media playback format;
storing the message in a memory device in the first media playback format;
responsive to receiving user input, adjusting the message including the first video content from the first media playback format to a second media playback format to generate an adjusted message;
generating an aggregated message by appending second video content to the adjusted message, wherein the second video content is from an other message that is selected from a group of messages being stored in the memory device, wherein the second video content is only a portion of video content of the other message;
transmitting to a set top box the aggregated message for presentation at a display device connected to the set top box; and
transmitting the second video content to a communication device, wherein the second video content is used as a greeting for the communication device.

16. A non-transitory computer-readable storage medium operating in a messaging system, comprising computer instructions which when executed by a processor cause the processor to perform a method, the method comprising:
receiving a message that includes first video content;
responsive to user input from a subscriber device representing a request for a format change, converting the first video content received in a first media playback format to a second media playback format;
appending second video content to the message, wherein the second video content is retrieved from one of a group of stored messages in response to a second user input from the subscriber device; and
transmitting the message and the first and second video content in the second media playback format to a set top box for presentation at a display device connected to the set top box; transmitting the second video content to a communication device, wherein the second video content is used as a greeting for the communication device.

17. The non-transitory computer-readable storage medium of claim 16, comprising computer instructions which when executed by the processor cause the processor to perform the method comprising extracting a portion of the message for use as the greeting.

18. The non-transitory computer-readable storage medium of claim 17, which when executed by the processor cause the processor to perform the method comprising:
analyzing content associated with each message of the group of stored messages to determine a corresponding category for each message;
storing the group of stored messages according to the corresponding category; and
retrieving the one message from the group of stored messages utilizing the corresponding category.

19. The non-transitory computer-readable storage medium of claim 16, comprising computer instructions which when executed by the processor cause the processor to perform the method comprising presenting one of a plurality of options to:
generate customized folders by grouping the message based on a content category; and
receive a service discount for opting to accept presentations of advertisement messages.

20. The non-transitory computer-readable storage medium of claim 19, wherein the customized folders group content according to a date content was received and communication identifiers associated with sources supplying content.

21. The non-transitory computer-readable storage medium of claim 20, wherein the communication identifiers comprise one of a telephone number and a session initiation protocol uniform resource identifier.

22. The non-transitory computer-readable storage medium of claim 19, comprising computer instructions which when executed by the processor cause the processor to perform the method comprising presenting another option to transfer files in bulk from one of the customized folders to a given destination.

23. The non-transitory computer-readable storage medium of claim 19, comprising computer instructions which when executed by the processor cause the processor to perform the method comprising presenting another option to:
- generate edited audio content by editing audio content of the message; and
- transmit the edited audio content to a communication device, wherein the communication device utilizes the edited audio content as a ring tone.

* * * * *